W. J. POWELL.
PLOW ATTACHMENT.
APPLICATION FILED APR. 2, 1914.
1,125,883.
Patented Jan. 19, 1915.
2 SHEETS—SHEET 1.
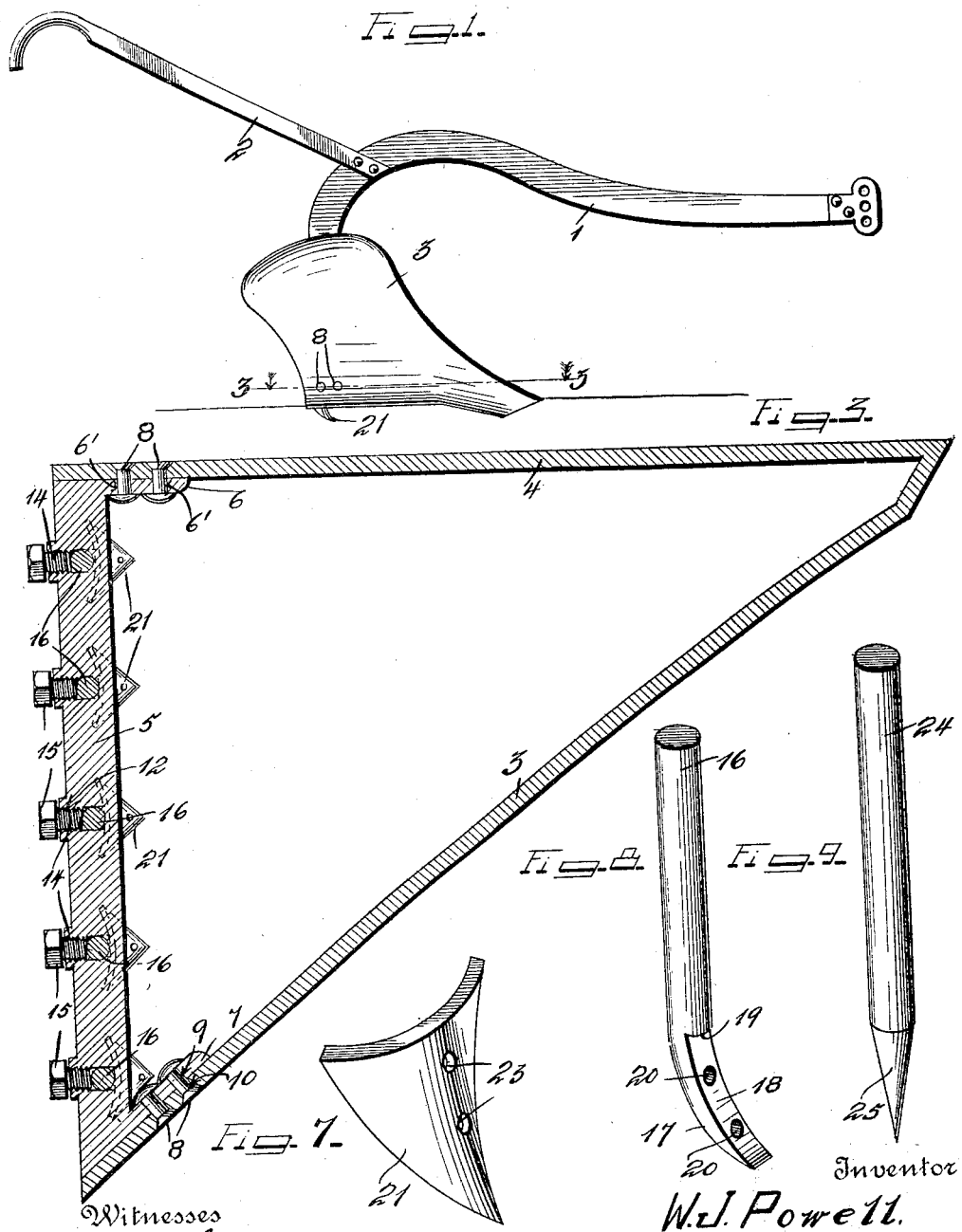

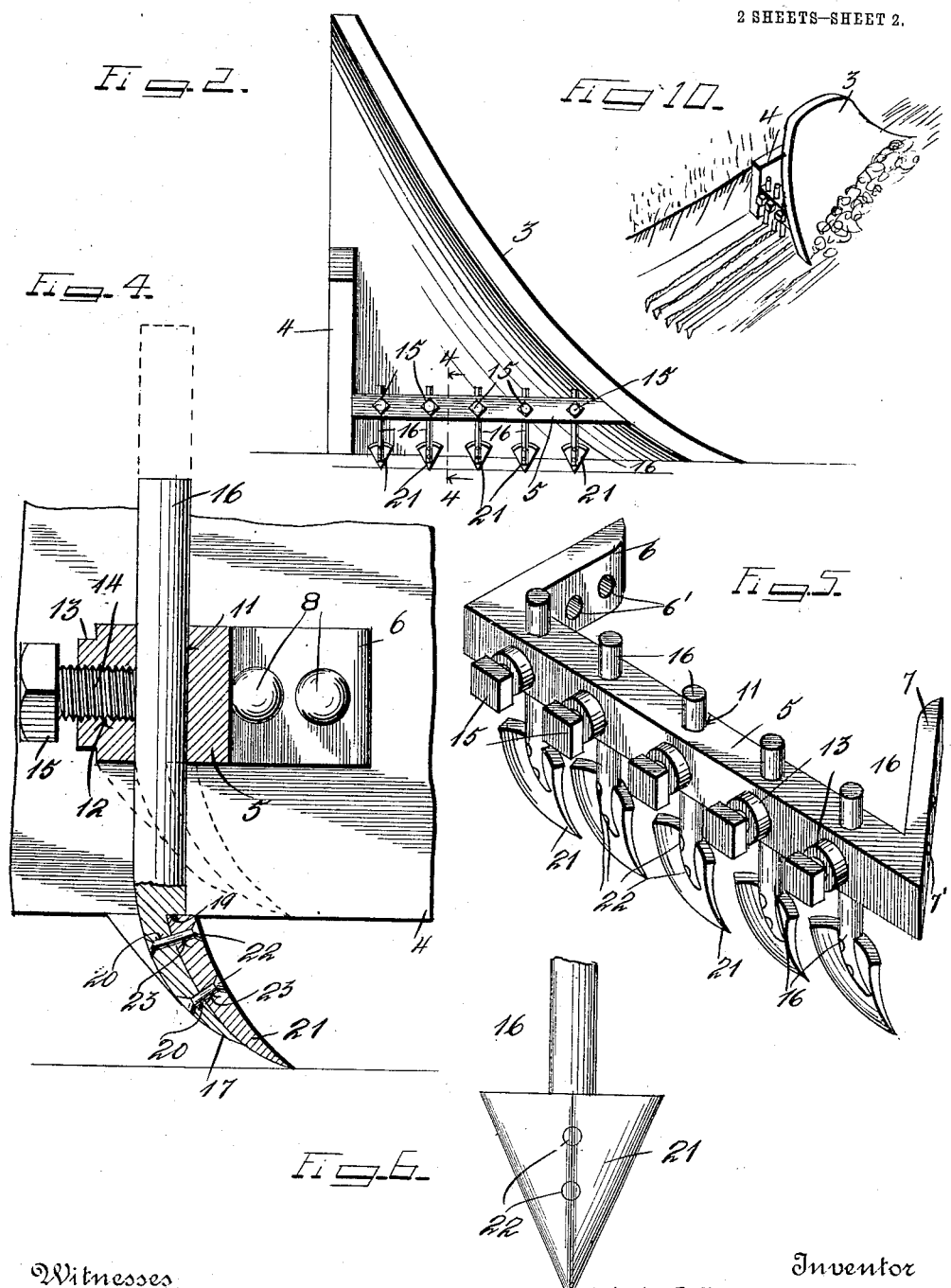

UNITED STATES PATENT OFFICE.

WILLIAM J. POWELL, OF COFFEYVILLE, KANSAS.

PLOW ATTACHMENT.

1,125,883.

Specification of Letters Patent. Patented Jan. 19, 1915.

Application filed April 2, 1914. Serial No. 829,113.

*To all whom it may concern:*

Be it known that I, WILLIAM J. POWELL, a citizen of the United States, residing at Coffeyville, in the county of Montgomery and State of Kansas, have invented certain new and useful Improvements in Plow Attachments, of which the following is a specification, reference being had therein to the accompanying drawing.

This invention relates to plows and has special reference to an attachment which is adapted to be secured to any ordinary plow and held in a position to allow the same to efficiently operate.

The principal object of this invention is the production of an attachment for a plow which is adapted to be secured to the mold-board and land-side so as to loosen the plow pan after the furrow has been thrown to one side.

Another object of this invention is the production of an attachment for a plow which is provided with a plurality of adjustable securing teeth, these teeth being adapted to loosen the plow pan for allowing the roots or a plant to penetrate more easily into the soil and at the same time provide for the storage of a greater amount of water than would be the case if the plow pan remained in its ordinary state.

With these and other objects in view this invention consists of certain novel combinations, constructions, and arrangements of parts as will be hereinafter fully described and claimed.

In the drawings:—Figure 1 is a side elevation of the plow showing the attachment secured thereto. Fig. 2 is a rear elevation of the mold-board and land-side of the plow showing the attachment carried thereby. Fig. 3 is a section taken on the line 3—3 of Fig. 1 looking in direction of the arrows. Fig. 4 is a section taken on the line 4—4 of Fig. 2 looking in direction of the arrows. Fig. 5 is a detailed perspective view of the attachment. Fig. 6 is a front elevation of one of the teeth. Fig. 7 is a detailed perspective view of one of the teeth showing the same detached from the supporting stem. Fig. 8 is a detailed perspective view of one of the supporting stems. Fig. 9 is a slightly modified form of one of the digging members. Fig. 10 is a perspective view of a portion of the plow in use showing the device attached thereto and illustrating the manner in which the attachment is used for digging up and loosening the plow pan after the plow body has passed thereover.

Referring to the accompanying drawings by numerals 1 designates an ordinary plow beam having the handles 2, mold-board 3, and land-side 4. The attachment which is adapted to be used in connection with this plow is capable of being used in connection with any make of plow which is provided with a mold-board and land-side, and does not require any particular form of a plow.

The attachment comprises a bar 5 which is preferably rectangular in cross section but may be of any desired shape. This bar 5 has an ear 6 formed integral upon one end, this ear 6 extending at right angles to the body of the bar 5. This ear 6 is provided with the transverse apertures 6' through which the securing rivets 8 are adapted to pass. These rivets 8 also pass through the land-side 4 as clearly disclosed in Fig. 3 for supporting the end portion upon which the ear 6 is formed in its correct position. The opposite end of the bar 5 is provided with an integral lip 7 which extends at an acute angle relative to the body of the bar 5 and is also provided with a slanting face 7' which fits snugly upon the curved inner face of the mold-board 3. This lip 7 is also provided with apertures 9 through which rivets 8 may be passed for securing the end of the bar 5 upon which the lip 7 is formed in engagement with the mold-board 3 since the rivets 8 pass through the apertures 10 formed in the rear lower portion of the mold-board 3. This bar 5 is provided with a plurality of vertical openings 11 which communicate with the transverse threaded openings 12. Collars 13 are formed integral upon the rear face of the bar 5 and surround the openings 12, these collars being internally threaded to provide enlarged gripping surfaces for the set-screws 14 and the enlarged heads 15 formed thereon. The supporting stems 16 pass through these vertical openings 11 and are held in an adjusted set position by means of the screws 14. The lower ends of the stems 16 are provided with the forwardly curved portion 17 which is provided with a cut-out portion 18 forming a shoulder 19, this forwardly curved portion 17 being provided with apertures 20. The teeth 21 which taper toward their lower portion and are bent rearwardly across their bodies are secured to the lower ends of the stems 16 so as to rest within the cut-out portion 18 of the forwardly curved portion 17 of each stem 16. The rivets 22 may then be passed through the apertures 23 formed in each tooth 21 and also pass through the apertures 20 formed in the forwardly curved lower end of each stem, since the apertures 20 register with the apertures 23.

By referring to Fig. 9 it will be seen that a slightly modified form of digging member has been provided which comprises a short rod 24 having a pointed lower end 25. This rod 24 is adapted to be positioned in the vertical openings 11 of the bar 5 instead of the stems 16, and these rods may be held in an adjusted position by the set-screws 14 so as to extend below the lower portion of the bar 5.

When this device is in operation it will be used similar to an ordinary plow in which case the mold-board 3 will turn over the furrow while the land-side will prevent the plow from moving laterally. In this case it will be seen that when an ordinary plow has turned over a furrow, the portion over which the land-side and mold-board have traveled is packed very hard and thereby constitutes what is generally known as the plow pan. Since the bar 5 is supported adjacent the rear lower portion of the mold-board and land-side, the teeth 21 may be adjusted so as to be positioned at a considerable distance below the lower portions of the mold-board. By adjusting the set-screws 14 the depth to which the teeth dig may be regulated or if so desired, the teeth may be moved up high enough as to be positioned out of the way and prevented from digging as disclosed in dotted lines in Fig. 4. It is desired, however to allow the teeth to extend below the mold-board as disclosed clearly in Figs. 1, 2 and 10 so as to cause the teeth to dig into and tear up and loosen the plow pan or the caked earth over which the plow has passed, as clearly disclosed in Fig. 10. By referring particularly to Fig. 10 it will be seen how the teeth dig into the ground for loosening the plow pan. This will allow the storage of considerable water so as to allow the ground to remain damp much longer than would be the case if the portion of the ground over which the plow passes remained in its normal packed condition. Furthermore, by allowing or causing this plow pan to be dug up by the teeth when the plow throws the next furrow the portion of the earth which had been previously loosened will be covered by the overturned furrow. This will cause the earth to be free and therefore will allow the roots of the grain or vegetable to easily penetrate to a greater depth and will consequently cause the grain and vegetable to grow more rapidly. From this construction it will be seen that as the mold-board is digging up a portion of the ground and overturning the furrow the teeth will follow the mold-board for loosening the packed earth. The rod disclosed in Fig. 9 will have the same effect as the teeth 21 and therefore it will be seen that minor details of construction may be made in this device without departing from the spirit of the invention.

I claim:

1. In a device of the class described the combination with a plow having a mold-board and land-side, of an attachment, said attachment comprising a bar positioned between said mold-board and land-side, an ear formed integral upon one end of said bar and extending at right angles thereto, a lip formed upon the opposite end of said bar and extending at an acute angle thereto, said lip provided with a slanting face for fitting upon the rear face of the mold-board, said ear fitting upon the inner face of the land-side, said lip and ear being fixedly secured to said mold-board and land-side, said bar being positioned at a spaced distance from the lower portion of the mold-board, and a plurality of teeth adjustably secured to said bar, said teeth adapted to project below the lower portion of the mold-board and follow in the path of travel of the mold-board whereby the packed earth over which the mold-board passes may be dug up or loosened for allowing moisture to be easily dug up.

2. In a device of the class described the combination with a plow having a mold-board and land-side, a bar fixedly secured to the lower portion of said mold-board and land-side and spanning the distance therebetween, said bar provided with a plurality of vertical openings, said bar also provided with transverse threaded openings communicating with said vertical openings, supporting stems positioned within said vertical openings, said stems positioned within said threaded openings, set screws adapted to engage said stems in an adjusted set position, and digging teeth or blades fixedly secured to the lower ends of said stems, said teeth adapted to follow the path of travel of a plow and dig into the packed portion of the soil over which the plow has passed for loosening and cultivating the same.

In testimony whereof I hereunto affix my signature in presence of two witnesses.

WILLIAM J. POWELL.

Witnesses:
 A. T. STIELLBER,
 THOMPSON BLACK, Jr.

Copies of this patent may be obtained for five cents each, by addressing the "Commissioner of Patents, Washington, D. C."